United States Patent [19]

Konetski et al.

[11] Patent Number: 4,471,489
[45] Date of Patent: Sep. 11, 1984

[54] AUTOMATIC ANSWER/ORIGINATE MODE SELECTION IN MODEM

[75] Inventors: Kenneth Konetski, Bethel; David M. Moon, New Milford, both of Conn.

[73] Assignee: General DataComm Industries, Inc., Danbury, Conn.

[21] Appl. No.: 245,549

[22] Filed: Mar. 19, 1981

[51] Int. Cl.³ .......................................... H04M 11/06
[52] U.S. Cl. .................................... 375/5; 179/2 DP
[58] Field of Search ................. 375/5, 7, 8; 179/2 A, 179/2 DP, 2 TS, 18, 18 J, 18 BD, 1 VC

[56] References Cited

U.S. PATENT DOCUMENTS

| | | | |
|---|---|---|---|
| 3,475,557 | 10/1969 | Morse et al. | 179/2 DP |
| 3,655,915 | 4/1972 | Liberman et al. | 179/2 DP |
| 3,769,454 | 10/1973 | Liberman et al. | 179/2 DP |
| 3,842,207 | 10/1974 | Fretwell | 179/2 DP |
| 3,852,531 | 12/1974 | Fretwell et al. | 179/2 DP |
| 3,908,086 | 9/1975 | Marino et al. | 179/2 DP |
| 3,927,265 | 12/1975 | Roedel et al. | 179/2 DP |
| 4,009,342 | 2/1977 | Fahrenschorn et al. | 179/2 DP |
| 4,291,200 | 9/1981 | Smith | 179/2 DP |

FOREIGN PATENT DOCUMENTS 1206639  9/1970  United Kingdom ............ 179/2 DP

Primary Examiner—Robert L. Griffin
Assistant Examiner—Stephen Chin
Attorney, Agent, or Firm—Pennie & Edmonds

[57] ABSTRACT

A method and apparatus are described for automatically placing a modem in the answer or originate mode of operation without the use of a ring detector or a manually operated answer/originate mode selection switch. A timer and two latches are connected in the modem in such a fashion that when the modem is switched into operation it is in the originate mode. For a period of time determined by the timer, the modem looks for the receipt of an answer tone from a remotely located modem. If the answer tone is detected within this time, the modem remains in the originate mode and completes a handshaking sequence with the remote modem. If, however, the answer tone is not received, the modem automatically switches to the answer mode of operation and transmits an answer tone as part of the handshaking sequence.

22 Claims, 2 Drawing Figures

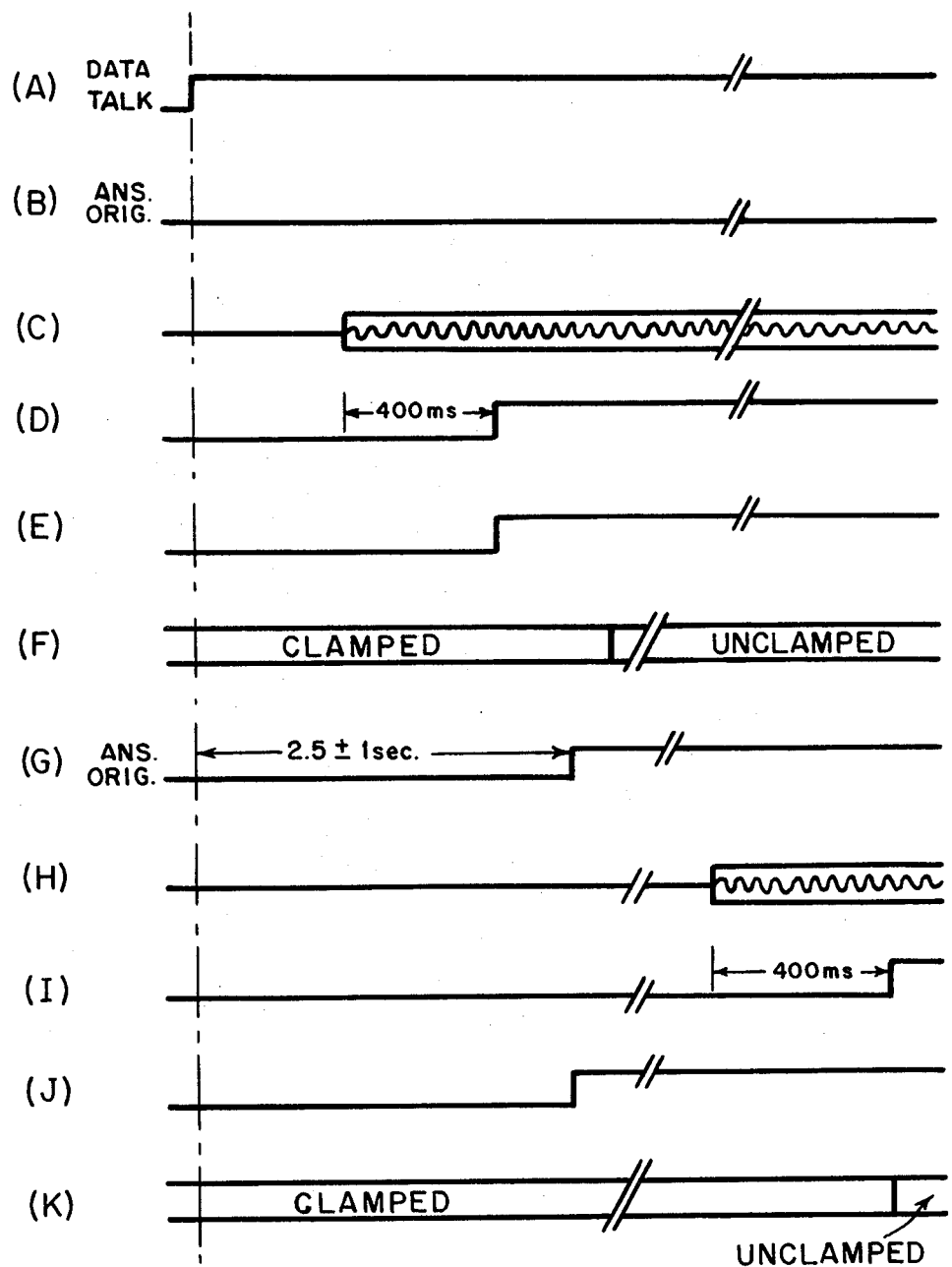

AUTOMATIC ANSWER/ORIGINATE MODE SELECTION IN MODEM

This relates to a modulator/demodulator, or modem, used in a data communication system and more particularly to a method and apparatus for automatic answer/originate mode selection in a modem.

As is well known, data is often transmitted over conventional public telephone networks in the form of pulses of certain frequencies. At one station in the network, a modulating device called a data set, or modem, is used to convert a DC signal representative of a stream of digital data into an AC signal representative of this same stream of digital data. At another station in the network, a second modem converts received AC signals back to digital DC signals. Ordinarily, data communication takes place in both directions on a telephone line and each modem is equipped both to convert DC signals to AC signals that are transmitted and to convert received AC signals to DC signals. Thus, in a typical data communication system, each subscriber has at least one modem transmitter/receiver by which he communicates with at least one other modem transmitter/receiver. For convenience, one modem may be referred to as the local modem and the other as the remote modem.

In a data communication system using frequency shift keying (FSK), one of the two DC levels that represents digital data is converted by the modem to an AC signal having a first frequency; while the other level of the DC signal is converted to an AC signal having a second frequency. It is conventional in the art to refer to one of these DC levels and the corresponding AC frequency as a SPACE or "0", and to the other DC level and the corresponding AC frequency as a MARK or "1".

To permit simultaneous two-way transmission of data signals over a two-wire line between a local and a remote modem in what is called full-duplex operation, MARK and SPACE signals are transmitted from one modem at frequencies that are centered about a first carrier (or center) frequency while they are transmitted from the other modem at frequencies that are centered about a second carrier frequency. Thus, the station from which data communication originates, which is said to be in the originate (ORIG) mode, uses a first carrier frequency $f_1$ for transmitting and a second carrier frequency $f_2$ for receiving. Simultaneously, the station that responds to the originating station, which is said to be in the answer (ANS) mode, must receive the first carrier frequency $f_1$ and send the second carrier frequency $f_2$. Typical values of the center frequencies $f_1$ and $f_2$ and of the frequencies for the $f_1$ MARK and SPACE signals and the $f_2$ MARK and SPACE signals are as follows:

| Originate Mode | Carrier Frequency | MARK | SPACE | Answer Mode |
|---|---|---|---|---|
| Sending | $f_1$ = 1170 Hz | 1270 Hz | 1070 Hz | Receiving |
| Receiving | $f_2$ = 2125 Hz | 2225 Hz | 2025 Hz | Sending |

While these frequencies are presently used in full-duplex data communication, it will be understood that they are only illustrative of the frequencies at which our invention may be practiced.

Extensive description of the operation of modems may be found in James Martin's book *Telecommunications and the Computer*, (Prentice Hall, 1969); in U.S. Pat. Nos. 3,655,915, 3,743,938, 3,769,454 and 3,869,577 all of which are incorporated herein by reference; and in the Bell System Data Communications Technical Reference entitled "Characteristics of Teletypewriter Exchange Service", (September 1970) available from: Engineering Director-Data Communications, American Telephone and Telegraph Company, 195 Broadway, New York, NY 10007.

One of the most widely used full-duplex modems is the 103-type direct connect modem. Until recently all such 103-type direct connect modems had the ability to automatically answer an incoming call and to place the modem in the answer mode of operation. Such automatic operation was achieved by use of a ring detector which sensed the ring signal transmitted from the public telephone central station, responded to this signal by going off hook and in addition automatically entered the answer mode of operation. A reduced cost version of the 103 modem recently became available which required manual switching of the modem from the talk mode to the data mode and manual switching between the answer and originate mode of operation. This version of the 103 modem reduced circuit costs by eliminating the ring detector although it became necessary to supply a switch to select the answer or originate mode. Obviously, however, manual operation of an answer/originate mode selection switch requires a certain amount of attention from the operator of the modem and is subject to possible operator error.

SUMMARY OF THE INVENTION

To eliminate the possibility of such error, we have devised a method and apparatus for automatically placing the modem in the answer or originate mode of operation without the use of a ring detector or a manually operated answer/originate mode selection switch. In accordance with our invention, we have added to the conventional modem a timer and two latches. These elements are connected in the modem in such a fashion that when the modem is switched into operation it is in the originate mode. For a period of time determined by the timer, the modem looks for the receipt of an answer tone from a remotely located modem. If the answer tone is detected within this time, the modem remains in the originate mode and comprises a handshaking sequence with the remote modem. If, however, the answer tone is not received, the modem automatically switches to the answer mode of operation without any operator intervention and transmits an answer tone as part of the handshaking sequence.

BRIEF DESCRIPTION OF THE DRAWINGS

These and other objects, elements, features and advantages of our invention will be more readily apparent from the following description of the best mode of carrying out the invention in which:

FIGS. 2A–K depict certain signals present in the apparatus of FIG. 1.

BEST MODE OF CARRYING OUT THE INVENTION

Figure 1:
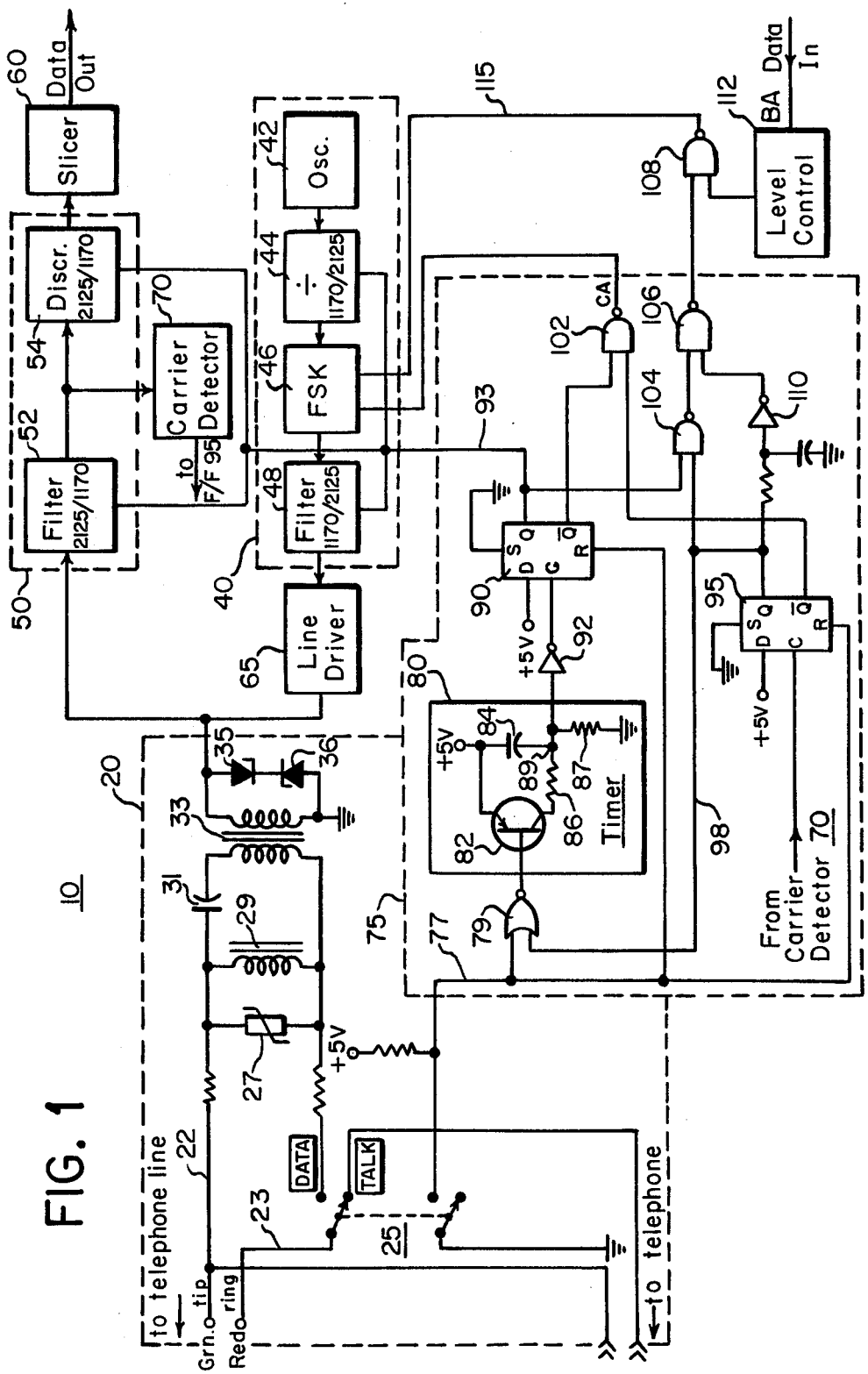
FIG. 1 is a block diagram of an illustrative embodiment of our invention.

FIG. 1 illustrates an illustrative embodiment of a manually operated 103-type direct connect modem modified in accordance with our invention to provide for automatic selection of the answer and originate modes. Modem 10 comprises a telephone line interface 20, a modulator 40, a demodulator 50, a signal slicer 60, a line driver 65 and a carrier detector 70. These elements accept data input signals from a local data source such as a computer (not shown), a Teletype terminal (not shown) or a private line network (not shown), convert them to frequency modulated signals and transmit them over the public telephone network to another modem (not shown). In addition, these elements receive frequency modulated signals from the public telephone network, demodulate them and provide data output signals to a local data sink such as a computer or a private line network. Each of these elements is found in conventional 103-type modems. Modem 10 further comprises a logic means 75 for automatically placing the modem in the answer or originate mode of operation without the use of a ring detector or a manually operated answer/originate mode selection switch. Logic means 75 comprises a timer 80, first and second latches 90, 95 and miscellaneous logic gates.

Telephone line interface 20 comprises first and second leads 22, 23, commonly referred to as tip and ring, a data/talk switch 25, a surge protector 27, an inductor 29, a blocking capacitor 31, a coupling transformer 33 and Zener diodes 35, 36. Data/talk switch 25 is a manually operated switch which permits the operator of the modem to connect the telephone line to modulator 40 and demodulator 50 for data communication or to a telephone (not shown) for voice communication. Surge protector 27 protects the local station from sudden changes in line voltage or current such as would be produced by lightning. Inductor 29 provides DC continuity in the circuit for an off-hook signal. Capacitor 31 blocks the DC component of the signal on lines 22, 23 and transformer 33 couples the AC signal on the telephone line to the rest of the local station. Zener diodes 35, 36 regulate the voltage level across one winding of transformer 33 and therefore control the maximum voltage developed across the transformer winding by either the telephone line or the modulator.

Modulator 40 comprises a master oscillator 42, a switched frequency divider 44, a frequency shift modulator 46 and a first switched filter 48. Oscillator 42 and divider 44 constitute a carrier signal generator. In the presence of a signal indicating that the modem is to operate in the originate mode of operation, divider 44 divides down the frequency of master oscillator 42 to a carrier (or center) frequency of 1170 Hz and filter 48 provides a band pass filter centered on 1170 Hz that is wide enough to pass the frequency shifted MARK and SPACE signals centered about 1170 Hz. Conversely, in the presence of a signal indicating that the modem is to operate in the answer mode of operation, divider 44 divides the master oscillator frequency to 2125 Hz and filter 48 provides a suitable pass band centered on 2125 Hz. The selected 1170 or 2125 Hz frequency is frequency shift modulated in modulator 46 by the input data signal to produce a signal that it is 100 Hz higher in the case of a MARK and 100 Hz lower in the case of a SPACE; and the frequency shifted signal and its carrier frequency are transmitted to the telephone line via filter 48, line driver 65 and coupling transformer 33.

Demodulator 50 comprises a second switched filter 52 and a switched discriminator 54. In the presence of the signal indicating that the modem is to operate in the originate mode, filter 52 operates to provide a pass band centered on 2125 Hz and discriminator 54 is conditioned to demodulate signals centered on that frequency. In the presence of the signal indicating that the modem is to operate in the answer mode, filter 52 provides a pass band centered on 1170 Hz and discriminator 54 demodulates signals centered on that frequency. In either case, the pass band of filter 52 and the frequency operating range of discriminator 54 is wide enough to process the MARK and SPACE signals centered about the center frequency. The demodulated data signal is then reshaped by signal slicer 60 and provided as a data output signal to the local data sink.

Carrier detector 70 connected between filter 52 and discriminator 54 senses the presence of a received carrier signal having a frequency within the receive filter pass band centered around 2125 Hz if the modem is in the originate mode or within the filter pass band centered around 1170 Hz if the modem is in the answer mode. If such a carrier signal is not detected, the output signal from detector 70 is low; and when the carrier signal is present, it is high. Illustratively, 400 milliseconds elapse between the time the carrier signal is received and the time the output signal goes high.

The answer and originate modes of operation are selected automatically by timer 80 and latches 90, 95 in logic means 75. Timer 80 comprises a transistor 82, a capacitor 84 and resistors 86, 87. Capacitor 84 is charged through resistor 87 by a 5 volt power supply. Transistor 82 and resistor 86 are connected across capacitor 84 so as to provide a discharge path for the capacitor when the transistor is ON.

Latches 90, 95 illustratively are implemented in a CMOS 4013-type dual D-type flip-flop. These latches transfer the logic level at the input D to the output Q when there is a positive-going transition of the signal at the clock input C. As shown in FIG. 1, the set terminals S of latches 90, 95 are grounded and the inputs D are connected to a 5 volt power supply. The reset terminals R of latches 90, 95 are connected via line 77 to data/talk switch 25. Line 93 from output Q of latch 90 is connected to divider 44 and filter 48 of modulator 40 and to filter 52 and discriminator 54 of demodulator 50. When the signal on line 93 is low, these elements are caused to function as described above for the originate mode of operation. When the signal on line 93 is high, these same elements operate in the answer mode. Line 98 from output Q of latch 95 provides one input to NOR gate 79 which, in turn, provides an input to timer 80. Line 77 provides a second input to NOR gate 79.

When switch 25 is set to "talk", the signal on line 77 is high, establishing a reset condition in latches 90, 95 for which their Q outputs are low. The high signal on line 77 also causes the output of NOR gate 79 to be low, as a result of which transistor 82 is ON. In this condition, the voltage at junction 89 between resistors 86 and 87 is determined by the relative magnitudes of resistors 86, 87. These magnitudes are selected so that this voltage is relatively high. In particular, the voltage signal is high enough that when the signal is inverted by an inverter 92 at clock input C to latch 90, the clock input to the latch is low. Since no signal is received by carrier detector 70 when data/talk switch 25 is set for "talk", the signal applied to clock input C of latch 95 is also low.

When data/talk switch 25 is changed to "data", line 77 is grounded, thereby terminating the reset condition at latches 90, 95. In the absence of any positive-going transition in clock input C to latch 90, output Q of latch 90 remains low and the modem remains in the originate mode. Likewise, the output Q of latch 95 is low. However, since the signals on lines 77 and 98 are now both low, the output of NOR gate 79 is high. The high signal turns OFF transistor 82, thereby permitting capacitor 84 to charge at a rate determined by its capacitance and the resistance of resistor 87. As the capacitor charges, the voltage at junction 89 decreases; and if the capacitor charges for a long enough period of time, the voltage will fall low enough to cause the output of inverter 92 to switch from low to high. The positive-going edge of this signal clocks the high signal on input D of latch 90 to output Q. A high signal on line 93 from output Q causes divider 44, filters 48, 52 and discriminator 54 to operate in the answer mode. At the same time and in known fashion, the change in state of latch 90 also causes modem 10 to transmit an answer tone to the remote station as part of a handshaking routine. This answer tone is a signal having a frequency of 2225 Hz and can be produced simply by transmitting the MARK signal produced at the output of modulator 46 when the modem is in the answer mode. Upon completion of handshaking, modem 10 is ready to receive and transmit data operating in the answer mode.

If a carrier signal is detected by detector 70 at any time after modem 10 switches to the answer mode, a positive-going signal will be produced at clock input C to latch 95. This signal clocks the high signal present at input D to output Q. When this high signal is applied to NOR gate 79 it will produce a low output that turns on transistor 82, discharges capacitor 84 and causes the voltage at junction 89 to rise. In turn, the signal applied to input C of latch 90 will go low but this will not alter the output of latch 90. As a result, modem 10 will remain in the answer mode until switch 25 returns the apparatus to the talk mode.

If, however, the local station is the one which initiated data communication with a remote station, then the remote station should send an answer tone to the local station as part of the handshaking procedure. Since modem 10 is in the originate mode of operation at the start of data communications, filter 52 has its pass band centered on 2125 Hz and the answer tone can be detected by carrier detector 70. If the answer tone is detected, a positive-going signal is produced at input C of latch 95 that disables timer 80 and prevents the modem from being switched into the answer mode. In particular, the positive-going signal at input C clocks the high signal on input D to output Q causing the signal on line 98 to become high. As a result, the output of NOR gate 79 becomes low, transistor 82 is turned ON, and capacitor 84 is discharged.

Advantageously, the RC time constant of resistor 87 and capacitor 84 is selected so that approximately 2.5±1 seconds elapse between the time data communications are initiated by setting switch 25 to the data mode and the time the voltage at junction 89 gets low enough to produce the positive-going signal which clocks latch 90 and produces a high output on line 93. With present signaling protocols, this interval of 1.5 to 3.5 seconds is sufficient time for a remote station which has been addressed by a modem in the originate mode to send back an answer tone and for carrier detector 70 to detect this tone and produce a signal on clock input C to latch 95. If this answer tone is received and the output of latch 95 is changed before the output of latch 90 is switched to a high signal, a positive-going signal is never received at the clock input to latch 90 and the modem remains in the originate mode. If, however, the answer tone is not received in the allotted interval, it is assumed that modem 10 should be in the answer mode of operation; and the modem is placed in that mode when the voltage at junction 89 falls low enough as to produce a positive-going signal at the clock input to latch 90.

NAND gate 102 is connected to outputs $\overline{Q}$ of latches 90, 95. When the output CA from this gate is low, there is no output from FSK modulator 46. Since the $\overline{Q}$ outputs are both high when the modem is initially switched to the data mode, there is initially no output from the carrier signal generator. An output is produced when either the modem is switched into the answer mode of operation or when an answer tone is detected and the state of latch 95 is changed.

NAND gates 104, 106, 108 and inverter 110 control the transmission of data from modem 10. Data signals are presented to the modem from the local data source on line BA; and their voltage levels are changed by level control 112 to levels suitable for use as inputs to gate 108. The output of gate 108 is applied via line 115 to FSK modulator 46. While output Q of latch 95 is low, the output of gate 108 is clamped high. As a result, data can not be transmitted until a carrier signal is detected by detector 70 and latch 95 changes state.

Illustrative wave forms useful in understanding our invention are set forth in FIGS. 2A–2K. FIG. 2A depicts the state of talk/data switch 25. FIG. 2B depicts the signal on line 93 for the case where the modem remains in the originate mode. FIGS. 2C through 2F indicate the signal received at the carrier detector 70, the signal on link 98, the signal CA and the data signals on line 115, respectively, for the case where the modem remains in the originate mode. FIG. 2C depicts the signal on line 93 for the case where the modem shifts to the answer mode. FIGS. 2H–2K depict the signal received at the carrier detector 70, the signal on line 98, the signal CA, and the data signals on line 115, respectively, for the case where the modem enters the answer mode.

As will be apparent from the above description, numerous changes may be made in the above described preferred embodiment which are within the spirit and scope of the invention. While the embodiment has been described with particular reference to an FSK system, it will be recognized that the invention may be practiced in any system where a modem is operated in one mode when it is the originator of data communication and in a second mode where it is responding to data communication initiated elsewhere. The application of the invention will also be apparent to acoustically coupled modems, to modems having automatic means for selecting between data communication and voice communication and to modems other than the 103 modem. For example, instead of using manual double pole single throw data/talk switch 25, the invention may be practiced using an automatic double pole single throw switch to make or break both the ground connection to line 77 of logic means 75 and the data signal flow path between tip 22 and ring 23 through coupling transformer 33. Numerous other devices for controlling the logic level on line 77 and for controlling the connection of data signals between the telephone communication line and the modulator and demodulator will be apparent to those skilled in the art. Further, it will be recognized that the signaling protocol set forth and the 1.5 to 3.5 second interval of timer 80 are only illustrative and can be varied as necessary.

What is claimed is:

1. In a data communication device comprising a communication line interface with means for selecting between data communication and voice communication, a modulator for transmitting data and a demodulator for receiving data in either an originate mode or an answer mode, and means for detecting the presence of a signal received from said communication line when said device is selected for data communication, a method of automatically establishing either the answer or originate mode of operation without the use of a ring detector comprising the steps of:
   conditioning the modulator and demodulator so that they are in the originate mode of operation whenever said device is initially selected for data communication,
   monitoring said communication line with said detecting means for receipt of a signal on said line, and
   if said signal is detected on said communication line within a specified period of time after the initiation of data communication, leaving said modulator and demodulator in the originate mode of operation, and if said signal is not detected within said specified period of time, causing the modulator and demodulator to operate in the answer mode of operation.

2. The method of claim 1 further comprising the step of using said signal detected on said communication line as part of a handshaking sequence if it is detected within said specified period of time or if said signal is not detected within said specified period of time transmitting a similar signal from said device on said communication line.

3. In a data communication modem having both an originate mode of operation in which outgoing data is transmitted by modulation of a first frequency and incoming data is received by demodulation of a data modulated second frequency and an answer mode of operation in which outgoing data is transmitted by modulation of said second frequency and incoming data is received by demodulation of a data modulated first frequency, a method of automatically establishing either the answer or originate mode of operation without the use of a ring detector comprising the steps of:
   conditioning the modem so that it is always in the originate mode of operation upon the initiation of data communication,
   monitoring an incoming data line for receipt of a signal within a pass band including said second frequency, and
   if said signal within said pass band is received within a specified period of time after the initiation of data communication, leaving the modem in the originate mode of operation, and if said signal within said pass band is not received within said specified period of time, causing said modem to operate in the answer mode of operation.

4. The method of claim 3 further comprising the step of using said signal within said pass band as part of a handshaking sequence if it is detected within said specified period of time or if said signal is not detected within said specified period of time transmitting a similar signal from said modem on said communication line.

5. The method of claim 1 or claim 3 wherein said specified period of time is on the order of two to three seconds.

6. In a data communication apparatus comprising a communication line interface with means for selecting between data communication and voice communication, a modulator for transmitting data and a demodulator for receiving data in either an originate mode or an answer mode, and means for detecting the presence of a signal received from said communication line when said device is selected for data communication, apparatus for automatically establishing either the answer or originate mode of operation without the use of a ring detector comprising:
   means for conditioning the modulator and demodulator so that they are in the originate mode of operation whenever said apparatus is initially selected for data communication, and
   means for causing the modulator and demodulator to operate in the answer mode of operation if said detecting means does not detect the presence of a signal received from said communication line within a specified period of time after the initiation of data communication and for leaving said modulator and demodulator in the originate mode of operation if said signal is received within said specified period of time.

7. The apparatus of claim 6 wherein said conditioning means comprises a first bistable device which has an output when the apparatus is initially selected for data communication such that said modulator and said demodulator are in the originate mode.

8. The apparatus of claim 7 wherein said causing means comprises a second bistable device and a timer, an output of said second bistable device being connected to said timer and an output of said timer being connected to said first bistable device, said timer causing said first bistable device to change its output a predetermined time after the apparatus is initially selected for data communication so as to put said modulator and demodulator in the answer mode, said detecting means changing said output of said second bistable device when said signal from said communication line is detected, said change in said output of said second bistable device resetting said timer.

9. In a data communication apparatus comprising a communication line interface with means for selecting between data communication and voice communication, a modulator for transmitting data and a demodulator for receiving data in either an originate mode or an answer mode, and means for detecting the presence of a predetermined signal received from said communication line when said device is selected for data communication, apparatus for automatically establishing either the answer or originate mode of operation without the use of a ring detector comprising:
   means for switching said modulator and demodulator to either the answer mode of operation or the originate mode of operation,
   means for conditioning said switching means so that the modulator and demodulator are in the originate mode of operation whenever said apparatus is initially selected for data communication, and
   timing means which cause said switching means to switch to the answer mode of operation if said detecting means does not detect said predetermined signal within a specified period of time after initiation of data communication.

10. The apparatus of claim 9 wherein said switching means comprises a first bistable device which has an output when the apparatus is initially selected for data communication such that said modulator and said demodulator are in the originate mode.

11. The apparatus of claim 10 wherein said timing means comprises a second bistable device and a timer, an output of said second bistable device being connected to said timer and an output of said timer being connected to said first bistable device, said timer causing said first bistable device to change its output a predetermined time after the apparatus is initially selected for data communication so as to put said modulator and demodulator in the answer mode, said detecting means changing said output of said second bistable device when said signal from said communication line is detected, said change in said output of said second bistable device resetting said timer.

12. In a data communication modem having both an originate mode of operation in which outgoing data is transmitted by modulation of a first frequency and incoming data is received by demodulation of a data modulated second frequency and an answer mode of operation in which outgoing data is transmitted by modulation of said second frequency and incoming data is received by demodulation of a data modulated first frequency, apparatus for automatically establishing either the answer or originate mode of opration without the use of a ring detector comprising:
means for conditioning the modem so that is is always in the originate mode of operation upon the initiation of data communication,
means for monitoring an incoming data line for receipt of a signal within a pass band including said second frequency, and
means for causing the modem to operate in the answer mode of operation if said signal having said second frequency is not received within a specified period of time after the initiation of data communication and for leaving said modem in the originate mode of operation if said second frequency signal is received within said specified period of time.

13. The apparatus of claim 12 wherein said conditioning means comprises a first bistable device which has an output when data communication is initiated such that said modem is in the originate mode.

14. The apparatus of claim 13 wherein said causing means comprises a second bistable device and a timer, an output of said second bistable device being connected to said timer and an output of said timer being connected to said first bistable device, said timer causing said first bistable device to change its output a predetermined time after data communication is initiated so as to put said modem in the answer mode, said detecting means changing said output of said second bistable device when said signal within said pass band is detected, said change in said output of said second bistable device resetting said timer.

15. In a data communication modem having both an originate mode of operation in which outgoing data is transmitted by modulation of a first frequency and incoming data is received by demodulation of a data modulated second frequency and an answer mode of operation in which outgoing data is transmitted by modulation of said second frequency and incoming data is received by demodulation of a data modulated first frequency, apparatus for automatically establishing either the answer or originate mode of operation without the use of a ring detector comprising:
means for switching said modem to either the answer mode of operation or the originate mode of operation,
means for conditioning said switching means so that the modem is always in the originate mode of operation upon initiation of data communication,
means for detecting at said modem the receipt of a predetermined signal from a remotely located modem, and
timing means which cause said switching means to switch to the answer mode of operation if said detecting means does not detect said predetermined signal within a specified period of time after initiation of data communication.

16. The apparatus of claim 15 wherein said switching means comprises a first bistable device which has an output when data communication is initiated such that said modem is in the originate mode.

17. The apparatus of claim 16 wherein said timing means comprises a second bistable device and a timer, an output of said second bistable device being connected to said timer and an output of said timer being connected to said first bistable device, said timer causing said first bistable device to change its output a predetermined time after data communication is initiated so as to put said modem in the answer mode, said detecting means changing said output of said second bistable device when said predetermined signal is detected, said change in said output of said second bistable device resetting said timer.

18. The method of claim 1 wherein the step of monitoring said communication line comprises the step of monitoring said communication line for receipt of an answer tone.

19. The method of claim 3 wherein the signal within a pass band is an answer tone.

20. The apparatus of claim 6 wherein the signal detected by said detecting means in an answer tone.

21. The apparatus of claim 12 wherein the signal within a pass band is an answer tone.

22. The apparatus of claim 9 or claim 15 wherein said predetermined signal is an answer tone.

* * * * *